(12) United States Patent
Chiang et al.

(10) Patent No.: US 6,690,833 B1
(45) Date of Patent: Feb. 10, 2004

(54) APPARATUS AND METHOD FOR MACROBLOCK BASED RATE CONTROL IN A CODING SYSTEM

(75) Inventors: Tihao Chiang, Plainsboro, NJ (US); Hung-Ju Lee, Robbinsville, NJ (US); Ya-Qin Zhang, Cranbury, NJ (US)

(73) Assignee: Sarnoff Corporation, Princeton, NJ (US)

( * ) Notice: Subject to any disclaimer, the term of this patent is extended or adjusted under 35 U.S.C. 154(b) by 396 days.

(21) Appl. No.: 09/099,617

(22) Filed: Jun. 18, 1998

Related U.S. Application Data
(60) Provisional application No. 60/052,437, filed on Jul. 14, 1997.

(51) Int. Cl.[7] .................................................. G06K 9/36
(52) U.S. Cl. ........................................ 382/236; 382/239
(58) Field of Search ................................. 382/181, 190, 382/232, 233, 235, 236, 238, 239, 240, 243, 244, 245, 246, 248, 250, 251, 252, 253, 261; 341/67; 395/200.77, 200.34; 348/420, 397, 416, 415, 701, 400, 403; 345/202

(56) References Cited

U.S. PATENT DOCUMENTS

| | | | |
|---|---|---|---|
| 5,134,476 A | | 7/1992 | Aravind et al. ............. 358/133 |
| 5,231,484 A | | 7/1993 | Gonzales et al. ............. 358/133 |
| 5,253,059 A | | 10/1993 | Ansari et al. ............... 358/138 |
| 5,367,629 A | * | 11/1994 | Chu et al. .................. 395/162 |
| 5,440,345 A | | 8/1995 | Shimoda ...................... 348/411 |
| 5,440,346 A | * | 8/1995 | Alattar et al. ............... 348/420 |
| 5,491,513 A | | 2/1996 | Wickstrom et al. .......... 348/390 |
| 5,493,514 A | * | 2/1996 | Keith et al. .............. 364/514 R |
| 5,509,089 A | * | 4/1996 | Ghoshal ...................... 382/236 |
| 5,528,238 A | * | 6/1996 | Nickerson ..................... 341/67 |
| 5,532,940 A | * | 7/1996 | Agarwal et al. .......... 364/514 R |
| 5,576,767 A | | 11/1996 | Lee et al. .................... 348/413 |
| 5,594,504 A | | 1/1997 | Ebrahimi ..................... 348/416 |

OTHER PUBLICATIONS

"A New Rate Control Scheme Using Quadratic Rate Distortion Model", T. Chiang and Y–Q. Zhang, IEEE Transactions on Circuits and Systems for Video Technology, vol. 7, No. 1, Feb. 1997, pp. 246–250.

A. Vetro, H. Sun, Joint Rate Control for Multiple Video Objects Based on Quadratic Rate–Distortion JTC1/SC29/WG11 Coding of Moving Pictures and Associated Audio, MPEG97/M1631 Feb. 17–21, 1997, Sevilla.

X.Chen,B.Eifrig,A.Luthra,"Rate Control for Multiple Higher Resolution VOs:A Report on CE Q2", JTC1/SC29/WG11 Coding of Moving Pictures and Associated Audio, MPEG97/M1657 Feb. 17–21, 1997, Sevilla, Spain.

A. Vetro, H. Sun, "Results of Core Experiments Q2: Comparison of VM and TMN6 Rate Control" JTC1/SC29/WG11 Coding of Moving Pictures and Associated Audio, MPEG97/M1797 Feb. 17–21, 1997, Sevilla, Spain.

* cited by examiner

*Primary Examiner*—Andrew W. Johns
(74) *Attorney, Agent, or Firm*—William J. Burke

(57) ABSTRACT

A method and apparatus for selecting a quantizer scale for each macroblock within a frame to optimize the coding rate is presented. A quantizer scale is selected for each macroblock within each frame such that the target bit rate for the frame is achieved while maintaining a uniform visual quality over the entire frame.

20 Claims, 5 Drawing Sheets

APPARATUS AND METHOD FOR MACROBLOCK BASED RATE CONTROL IN A CODING SYSTEM

This application claims the benefit of U.S. Provisional Application No. 60/052,437 filed Jul. 14, 1997, which is herein incorporated by reference.

The present invention relates to an apparatus and concomitant method for optimizing the coding of motion video. More particularly, this invention relates to a method and apparatus that adaptively adjusts a quantizer scale for each macroblock within a frame to maintain the overall quality of the motion video while optimizing the coding rate.

BACKGROUND OF THE INVENTION

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast.

In the area of rate control, MPEG does not define a specific method for controlling the bit rate of an encoder. It is the task of the encoder designer to devise a rate control process for controlling the bit rate such that the decoder input buffer neither overflows nor underflows.

Currently, one way of controlling the bit rate is to alter the quantization process, which will affect the distortion of the input video image. By altering the quantizer scale (step size), the bit rate can be changed and controlled.

Although changing the quantizer scale is an effective method of implementing the rate control of an encoder, it has been shown that a poor rate control process will actually degrade the visual quality of the video image, i.e., failing to alter the quantizer scale in an efficient manner such that it is necessary to drastically alter the quantizer scale toward the end of a picture to avoid overflow and underflow conditions. Since altering the quantizer scale affects both image quality and compression efficiency, it is important for a rate control process to control the bit rate without sacrificing image quality.

In the current MPEG coding strategies (e.g., various MPEG test models), the quantizer scale for each frame is selected by assuming that all the pictures of the same type have identical complexity within a group of pictures. However, the quantizer scale selected by this criterion may not achieve optimal coding performance, since the complexity of each picture will vary with time.

Furthermore, encoders that utilize global-type transforms, e.g., wavelet transform (otherwise known as hierarchical subband decomposition), have similar problems. For example, wavelet transforms are applied to an important aspect of low bit rate image coding: the coding of a binary map (a wavelet tree) indicating the locations of the non-zero values, otherwise known as the significance map of the transform coefficients. Quantization and entropy coding are then used to achieve very low bit rates. It follows that a significant improvement in the proper selection of a quantizer scale for encoding the significance map (the wavelet tree) will translate into a significant improvement in compression efficiency and coding rate.

Furthermore, rate control can be implemented at lower levels within a frame e.g., at the macroblock or block levels. However, macroblock level rate control is generally more costly, since there is an additional overhead if quantization parameter (quantizer scale) is changed within a frame. Namely, more bits are needed to communicate to the decoder of the different quantizer scales for different macroblocks within each frame. This criticality is exacerbated in low bit rate applications, where proper bit management is very important.

Therefore, a need exists in the art for an apparatus and method that adaptively adjusts a quantizer scale for each macroblock within a frame to maintain the overall quality of the motion video while optimizing the coding rate.

SUMMARY OF THE INVENTION

The present invention is a method and apparatus for selecting a quantizer scale for each block, e.g., a macroblock, within each frame to maintain the overall quality of the video image while optimizing the coding rate. Namely, a quantizer scale is selected for each macroblock within each frame (picture) such that the target bit rate for the picture is achieved while maintaining a uniform visual quality over the entire frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
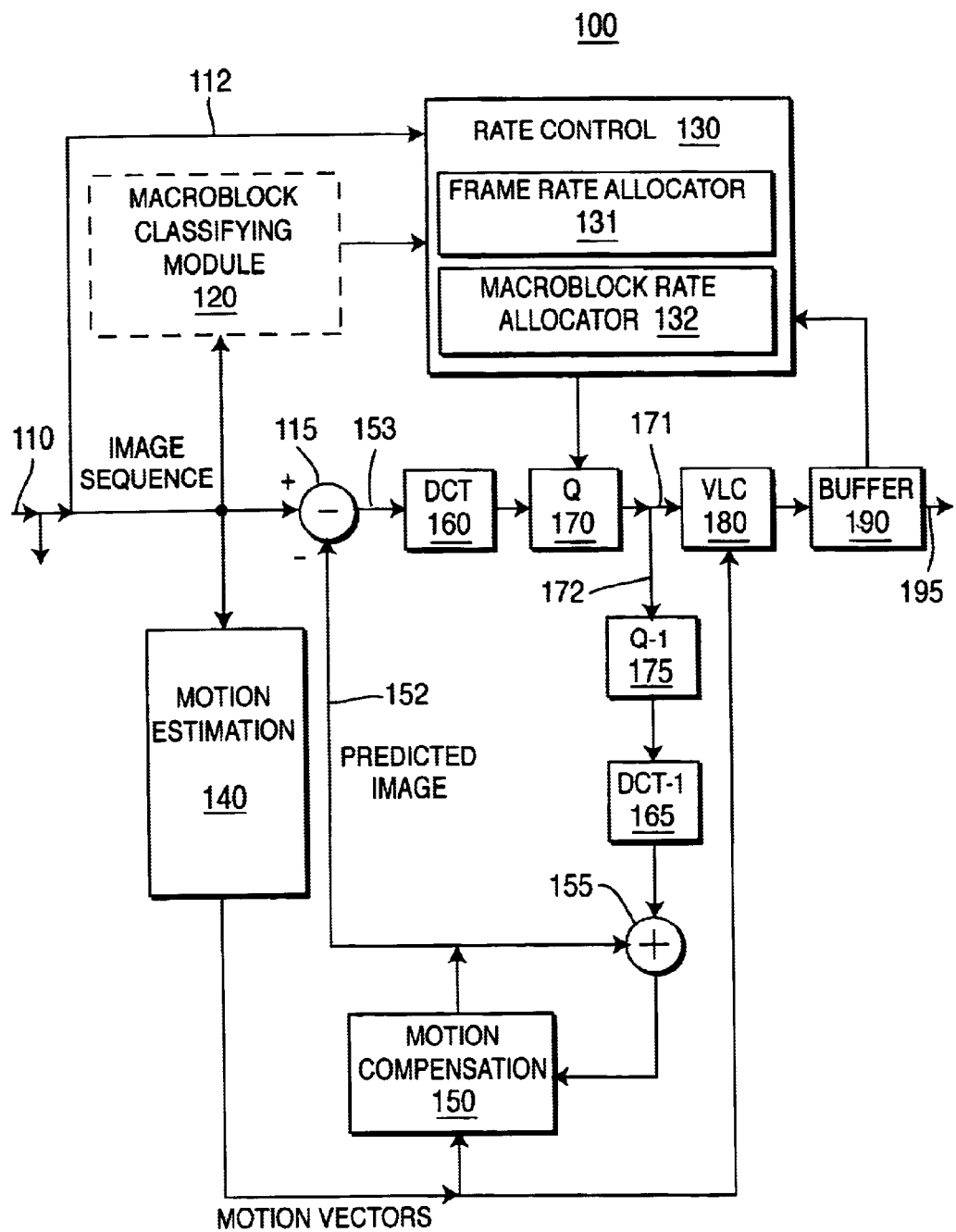
FIG. 1 illustrates a block diagram of the apparatus of the present invention.

FIG. 1 depicts a block diagram of the apparatus 100 of the present invention for deriving a quantizer scale for each macroblock within each frame to maintain the overall quality of the video image while controlling the coding rate. Although the present invention is described below with reference to a MPEG compliant encoder, those skilled in the art will realize that the present invention can be adapted to other encoders that are compliant with other coding/decoding standards.

In the preferred embodiment of the present invention, the apparatus 100 is an encoder or a portion of a more complex block-based motion compensation coding system. The apparatus 100 comprises a motion estimation module 140, a motion compensation module 150, a rate control module 130, a DCT module 160, a quantization (Q) module 170, a variable length coding (VLC) module 180, a buffer 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on signal path 110 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The following disclosure uses the MPEG standard terminology; however, it should be understood that the term macroblock or block is intended to describe a block of pixels of any size or shape. Broadly speaking, a "macroblock" could be as small as a single pixel, or as large as an entire video frame.

The input image on path 110 is received into motion estimation module 140 for estimating motion vectors. A motion vector is a two-dimensional vector which is used by motion compensation to provide an offset from the coordinate position of a block in the current picture to the coordinates in a reference frame. The reference frames can be a previous frame (P-frame), or previous and/or future frames (B-frames). The use of motion vectors greatly enhances image compression by reducing the amount of information that is transmitted on a channel because only the changes between the current and reference frames are coded and transmitted.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Furthermore, prior to performing motion compensation prediction for a given macroblock, a coding mode must be selected. In the area of coding mode decision, MPEG provides a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current macroblock to form an error signal or predictive residual signal on path 153. The formation of the predictive residual signal effectively removes redundant information in the input video image. It should be noted that if a current frame is encoded as an I-frame, then the signal on path 153 is simply the original picture and not a predictive residual signal.

The DCT module 160 then applies a forward discrete cosine transform process to each block of the predictive residual signal to produce a set of eight (8) by eight (8) block of DCT coefficients. The DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 130.

Next, the resulting 8×8 block of quantized DCT coefficients is received by variable length coding (VLC) module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Variable length coding (VLC) module 180 then encodes the string of quantized DCT coefficients and all side-information for the macroblock using variable length coding and run-length coding.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 on path 195 is a compressed representation of the input video image on path 110 (or a compressed difference signal between the input image and a predicted image), where it is sent to a storage medium or telecommunication channel via path 195.

The rate control module 130 serves to monitor and adjust the bit rate of the data stream entering the FIFO buffer 190 to prevent overflow and underflow on the decoder side (within a receiver or target storage device, not shown) after transmission of the data stream. Thus, it is the task of the rate control module 130 to monitor the status of buffer 190 to control the number of bits generated by the encoder.

In the preferred embodiment of the present invention, rate control module 130 selects a quantizer scale for each block, e.g., a macroblock within each frame to maintain the overall quality of the video image while controlling the coding rate. Namely, a frame can be evaluated to determine if certain blocks within the frame require more or less bit rate allocation. It has been observed that for different applications, various blocks are of more interest than other blocks, e.g., the face of a person in a video phone application is more important to a human viewer than the background in general. Other examples include medical applications, where certain blocks of an image, i.e., a potential tumor is more important than the surrounding tissues or in surveillance applications, where certain blocks of an image, i.e., a military assess is more important than the surrounding camouflage, and so on. Thus, the particular application will dictate the criteria that define the importance of relevant blocks within a frame. In the present invention, a quantizer scale is selected for each macroblock within each frame such that target bit rate for the frame is achieved while maintaining a uniform visual quality over the entire frame.

It should be understood that although the present invention is described with an encoder implementing temporal (e.g., motion estimation/compensation) and spatial encoding (e.g., discreet cosine transform), the present invention is not so limited. Other temporal and spatial encoding methods can be used, including no use of any temporal and spatial encoding.

Specifically, the rate control module 130 comprises a frame rate allocator 131 and a macroblock rate allocator 132. The frame rate allocator 131 allocates a bit budget (target frame bit rate) for a current frame, whereas the macroblock rate allocator 132 allocates a bit budget (target macroblock bit rate or target block bit rate) for each macroblock within the current frame.

In brief, the frame rate allocator 131 initially obtains a rough estimate of the complexity of a specific type of picture (I, P, B) from previously encoded pictures or by implementing various MPEG test models. This estimated complexity is used to derive a predicted number of bits necessary to code each frame. With this knowledge, a quantizer scale is calculated for the frame in accordance with a complexity measure having a polynomial form. This complexity measure is derived to meet the constraint that the selected quantizer scale for the frame should approach the target bit rate for the picture. Once the frame is encoded, the rate control module recursively adjusts the complexity measure through the use of a polynomial regression process. That is, the actual number of bits necessary to code the macroblock is used to refine the complexity measure so as to improve the prediction of a quantizer scale for the next frame. In the course of computing the quantizer scale, the "target frame bit rate" is also recursively updated. This frame rate allocating method was disclosed in patent application entitled "Apparatus And Method For Optimizing The Rate Control In A Coding System", filed on Feb. 11, 1998, with Ser. No. 09/022,349 which is incorporated herein by reference. It should be understood that the present invention can be implemented using other frame bit rate allocating methods, e.g., frame bit rate allocating methods that are based on a distortion measure and the like.

In brief, the macroblock rate allocator 132 then applies the calculated target frame bit rate to determine one or more target macroblock bit rates, where the bits of the target frame bit rate are distributed proportional to the mean of the absolute differences (MAD) and the weighting for a macroblock. A detailed description of the target macroblock bit rate and corresponding quantizer scale selection method is discussed below with reference to FIG. 4.

However, due to human visual responses, some macroblocks may be deemed to be more important than other macroblock to a human viewer. The importance of a macroblock is determined by an optional macroblock classifying module 120. The macroblock classifying module 120 contains the necessary criteria to define the importance of the macroblocks within each frame. Various macroblock classifying methods are available, e.g., as disclosed in patent application entitled "Apparatus And Method For Employing M-Ary Pyramids To Enhance Feature-Based Classification And Motion Estimation", filed on Dec. 31, 1997, with Ser. No. 09/002,258, which is incorporated herein by reference. The "importance" of a macroblock is accounted through the use of weighting as described below. In brief, if a macroblock is very important, then more bits are allocated to the macroblock, whereas if a macroblock is not very important, then less bits are allocated to the macroblock.

Alternatively, the "macroblock based" information, e.g., which macroblocks are more important, which macroblocks carry what type of information, e.g., foreground, background, or objects in a frame and the like, can be obtained directly from the image sequence on path 112. Namely, if the image sequence was previously processed and stored on a storage medium, e.g., a stored video sequence or program on a server, then it is possible that the encoder that generated the stored video sequence may pass along "macroblock based" information. In other words, "macroblock based" information can be transmitted to the encoder 100 along with the image sequence. In such implementation, the macroblock classifying module 120 can be omitted, since the macroblock based information is readily available.

Returning to FIG. 1, the resulting 8×8 block of quantized DCT coefficients from the quantization module 170 is also received by the inverse quantization module 175 via signal connection 172. At this stage, the encoder regenerates I-frames and P-frames of the input video image by decoding the data so that they are used as reference frames for subsequent encoding.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture (reconstructed image).

Figure 2:
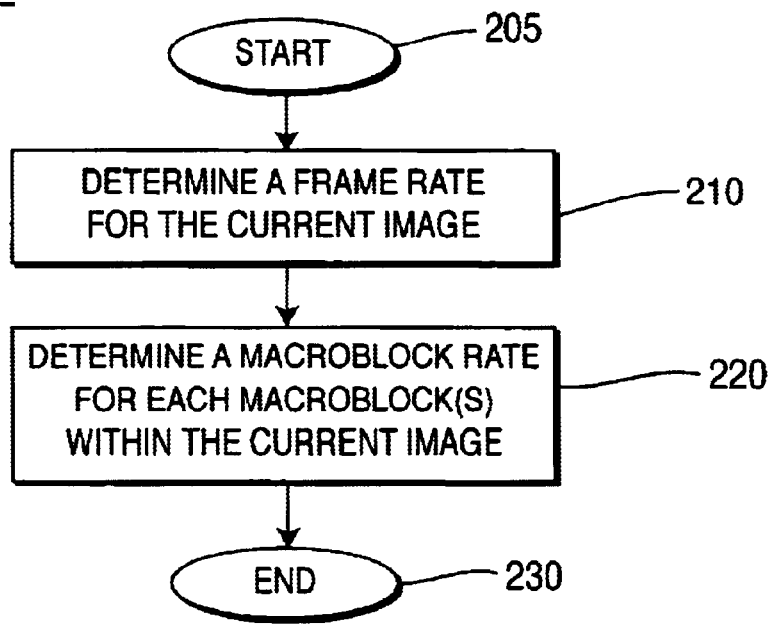
FIG. 2 illustrates a block diagram of a flowchart of a method for deriving and allocating the target bit rate for an image based on blocks within the image.

FIG. 2 depicts a block diagram of a flowchart of a method 200 for deriving and allocating bits for an image based on macroblocks within the image. More specifically, method 200 starts in step 205 and proceeds to step 210 where a target frame bit rate is determined for a current frame. In the preferred embodiment, the target frame bit rate is determined using a complexity measure that is recursively adjusted through the use of a polynomial regression process (as illustrated in FIG. 3).

Figure 3:
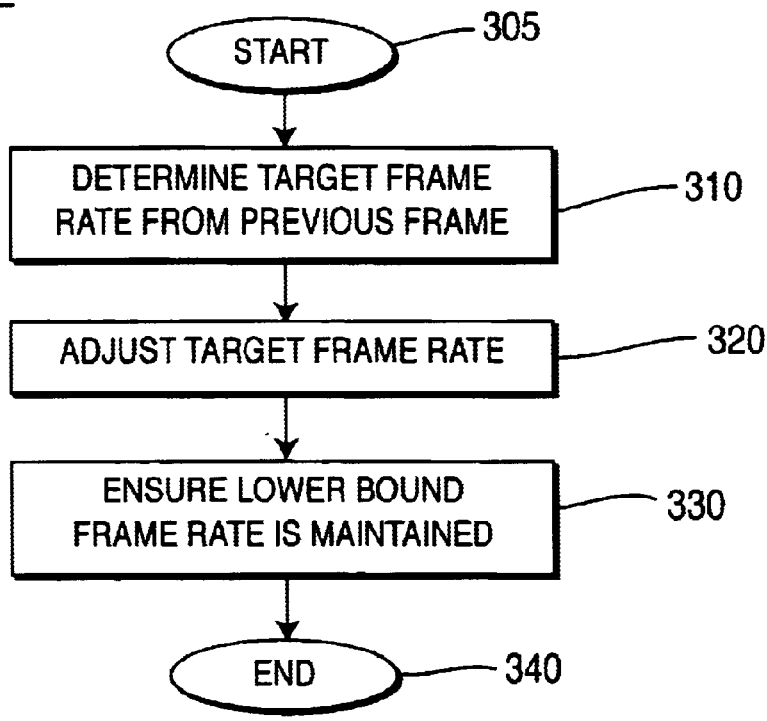
FIG. 3 illustrates a flowchart of a method for determining a target frame bit rate.

FIG. 3 illustrates a flowchart of a method 300 for determining a target frame bit rate. Referring to FIG. 3, the method begins at step 305 and proceeds to step 310, where the method determines the target bits (target frame bit rate) for a frame, $T_{frame}$ as:

$$T_{frame} = \frac{R}{Nf} \times (1 - \text{past\_percent}) + T_{previous\ frame} \times \text{past\_percent} \quad (1)$$

where R is the remaining number of bits for a sequence of frame, Nf is the number of remaining frames in the sequence, $T_{previous\ frame}$ is the number of bits used for encoding the previous frame, and the past_percent is a constant. In the preferred embodiment, the constant past_percent is selected to be 0.05. However, the present invention is not so limited. Other values can be employed, that depend on the specific applications or the context of the images. In fact, these values can be adjusted temporally.

In sum, equation (1) allows the target frame bit rate to be computed based on the bits available and the last encoded frame bits. If the last frame is complex and uses many bits, it leads to the premise that more bits should be assigned to the current frame. However, this increased allocation will diminish the available number of bits for encoding the remaining frames, thereby limiting the increased allocation to this frame. A weighted average reflects a compromise of these two factors, as illustrated in the second term in equation (1).

In step 320, method 300 then adjusts the calculated target frame bit rate, $T_{frame}$ by the current buffer fullness as:

$$T'_{frame} = \frac{(a + c \times b)}{(c \times a + b)} \times T_{frame} \quad (2)$$

where $T'_{frame}$ is the adjusted target bit rate, "a" is the current buffer fullness (the portion of the buffer that contains bits to be sent to the decoder), and b is (the physical buffer size—buffer fullness (a)), and c is a constant selected to be a value of 2 (other values can be used). As such "b" represents the remaining space in the buffer. Equation (2) indicates that if the buffer is more than half full, the adjusted target bit rate $T'_{frame}$ is decreased. Conversely, if the buffer is less than half full, the adjusted target bit rate $T'_{frame}$ is increased. If the buffer is exactly at half, no adjustment is necessary, since equation (2) reduces to $T'_{frame} = T_{frame}$.

In step 330, method 300 then optionally verifies that a lower bound of target frame bit rate ($R_s/30$) is maintained as:

$$T_{frame} = \text{Max}(R_s/30, T_{frame}) \quad (3)$$

It should be noted that equation (3) allows $T_{frame}$ to take the greater (max) of two possible values, where $R_s$ is a bit rate for the sequence (or segment), e.g., 24000 bits/sec). Namely, a lower bound of target rate ($R_s/30$) is used to maintain or guarantee a minimal quality, e.g., 800 bits/frame can be set as a minimum. If the minimal quality cannot be maintained, the encoder has the option to skip the current frame altogether. Method 300 then ends in step 340.

It should be understood that other frame bit rate allocation methods can be used, e.g., the MPEG TM4 and TM5, with the present invention. However, since the target macroblock bit rates are derived using the target frame bit rate, the computational overhead and the accuracy of the target macroblock bit rates are affected by the frame bit rate allocation method that is employed. For example, if it is desirable to minimize computational complexity at the expense of performance, then it may be appropriate to employ the frame bit rate allocation methods of MPEG TM4 and TM5. In contrast, if it is desirable to maximize performance at the expense of increasing computational complexity, then it may be appropriate to employ the frame bit rate allocation method of the patent application Ser. No. 09/022,349, or other more complex frame bit rate allocation methods.

Figure 4:
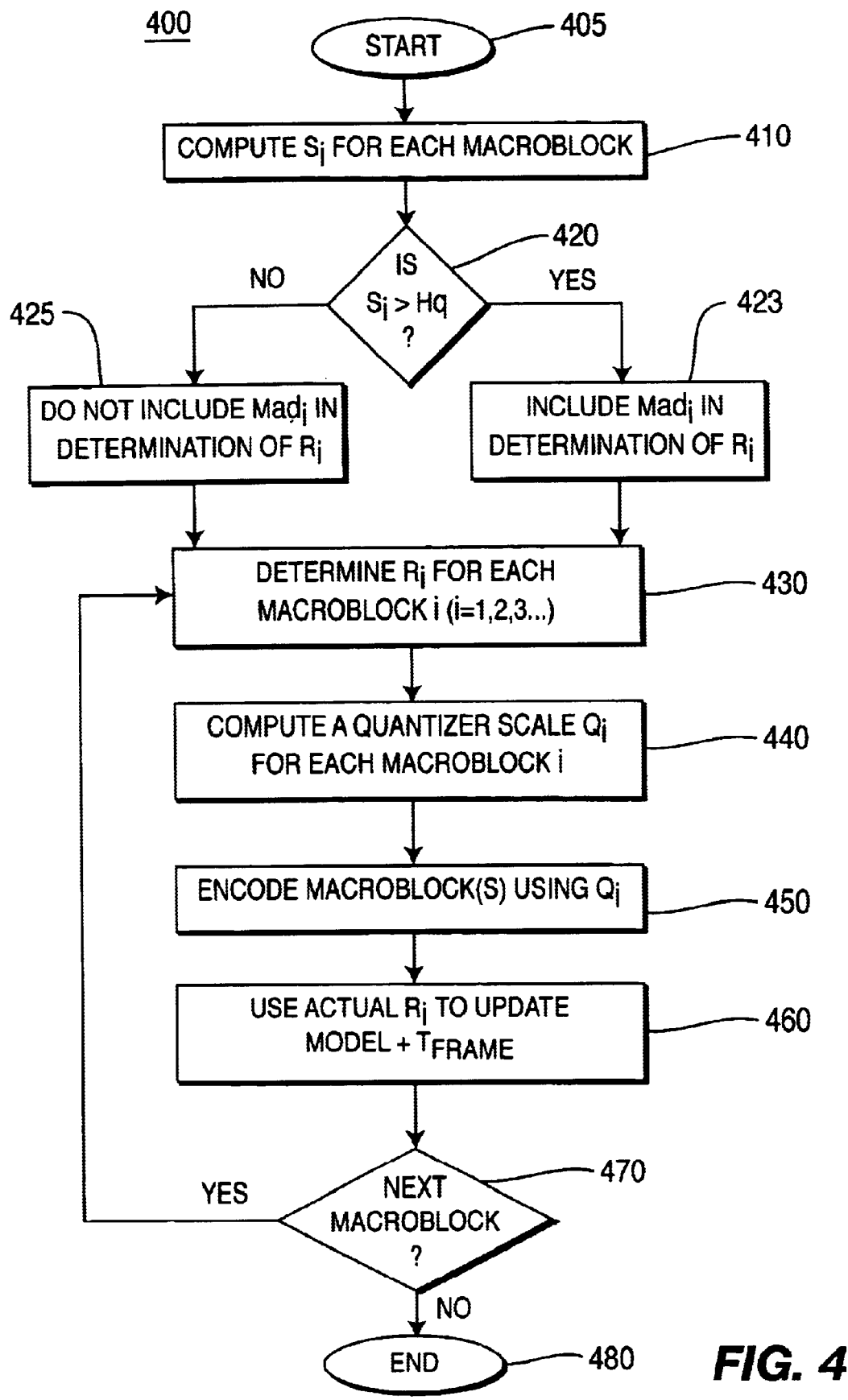
FIG. 4 illustrates a flowchart of a method for determining one or more target macroblock bit rates for the macroblocks within the current image.

Returning to FIG. 2, once $T_{frame}$ is determined, method 200 then determines one or more target macroblock bit rates for the macroblocks within the current image as illustrated in FIG. 4 below. Method 200 then ends in step 230.

FIG. 4 illustrates a flowchart of a method 400 for determining one or more target macroblock bit rates for the macroblocks within the current image. The method starts in step 405 and proceeds to step 410, where a sum of absolute difference (SAD) $S_i$ is performed for each macroblock i. Namely, the absolute difference between each pixel value (in the original image) and the corresponding pixel value (in the predicted image) is performed for pixels defined within the macroblock. Next, the sum of all the absolute differences of the pixels for the macroblock is performed to generate the SAD for the macroblock i.

In step 420, method 400 queries whether $S_i$ is greater than the threshold $H_q$. The threshold $H_q$ is selected to remove various macroblocks from the present macroblock bit allocation method. Namely, it is anticipated that information in certain macroblocks will be eliminated or reduced to zero through either spatial filtering or quantization. Since these macroblocks will be deemed to carry no information, bits will not be allocated to these macroblocks. Thus, the threshold $H_q$ serves to eliminate various macroblocks from consideration.

In operation, the threshold $H_q$ is selected as the average of all the mean absolute difference (MADs) that have been skipped in the previous frame, where $MAD_i$ is defined as the $S_i$ divided by the number of pixels in the macroblock i. However, if the current frame is the first frame in the image sequence, then $H_q$ is set to be half of the average of all the existing MADs in this current frame.

Thus, if the query at step 420 is answered negatively, then method 400 proceeds to step 425, where the present macroblock i is removed from consideration for receiving bit allocation. If the query at step 420 is answered positively, then method 400 proceeds to step 423, where the present macroblock i will be considered for receiving bit allocation, as discussed below.

In step 430, target macroblock bit rate, $R_i$, is determined for each macroblock i (i=1, 2, 3 . . . ) as follows:

$$R_i = K_i \times T_{frame} \quad (4)$$

$$K_i = \frac{Mad_i w_i}{\sum_{k=i}^{n} Mad_k w_k} \text{ for } Mad_k \text{ having } SAD_k > H_q \qquad (5)$$

where $Mad_i$ is the mean absolute difference (MAD) of an macroblock i, "n" is the number of macroblocks in a frame, "w" is a weighting factor and $R_i$ is the estimated target macroblock bit rate for macroblock i. The weighting factor w allows $R_i$ for a given macroblock to be adjusted in accordance with other criteria. Namely, it has been observed that some macroblocks can be viewed as being more important than other macroblocks, where "importance" is not based solely on the MAD of an macroblock. Various applications as illustrated above, may place emphasis on certain macroblocks. By incorporating an optional weighting factor w, more or less bits can be allocated to a particular macroblock based upon application specific criteria. In the preferred embodiment, w is set to a value of "1", but other values can be used as necessary for a particular application.

Thus, the target frame bits $T_{frame}$ are distributed proportional to the mean of the absolute differences (MAD) of a macroblock. For example, if an image has only four (4) macroblocks "a", "b", "c" and "d", having $Mad_a=1$, $Mad_b=1$, $Mad_c=3$ and $Mad_d=4$, respectively, $T_{frame}=100$ and $H_q$ is such that macroblocks a and b are removed from consideration for receiving bit allocation, then, $R_c$ and $R_d$ are given respectively as:

$$R_c = \frac{3w_c}{3w_c + 4w_d} \times 100 \text{ and } R_d = \frac{4w_d}{3w_c + 4w_d} \times (100 - R_c).$$

Thus, the MADs of macroblocks a and b are not used in the determination of $R_c$ and $R_d$. Furthermore, the above example illustrates the need to update $T_{frame}$ after each $R_i$ is allocated to a macroblock.

Once $R_i$ for each macroblock in the image is determined, method 400, in step 440 calculates a quantization scale $Q_i$ for each macroblock i. In the preferred embodiment, the quantization scale $Q_i$ is calculated in accordance with a distortion measure as described in U.S. patent application with Ser. No. 09/022,349. In brief, the quantizer scale $Q_i$ is derived from a quadratic rate-distortion method as expressed below:

$$R_i = X_1 E_i Q_i^{-1} + X_2 E_i Q_i^{-2} \text{ where } \sum_i R_i = T_{frame} \qquad (6)$$

where $R_i$ is the actual bits used for macroblock i, $Q_i$ represents a quantization level or scale selected for the macroblock i, $E_i$ represents a distortion measure. In the preferred embodiment, $E_i$ represents a sum of all the mean absolute differences (MADs) for those macroblocks having $R_i$ for the current frame. Namely, the measure $E_i$ provides a method of adjusting the macroblock bit budget to account for the differences in the macroblock between successive frames in a sequence. In other words, the greater the differences between an macroblock in the current frame and the same macroblock in a previous frame, the greater the number of bits that will be required to code the macroblock in the current frame. Furthermore, other distortion measures can be used, such that $E_i$ may represent mean square error or just-noticeable difference (jnd).

During initialization, $R_i$ in equation (6) is substituted with the calculated $R_i$ to generate $Q_i$. The parameters $X_1$ and $X_2$ are initialized as follows:

$X_1 = (R_s * N_s)/2$ $X_2 = 0 \qquad (7)$ $R_s$ represents the bit rate for the sequence (or segment), e.g., 24000 bits per second. $N_s$ represents the distance between encoded frames. Namely, due to low bit rate applications, certain frames within a sequence may not be encoded (skipped), e.g., the encoder may only encode every fourth frame. It should be understood that the number of skipped frames can be tailored to the requirement of a particular application. Thus, in step 440, the quantizer scale $Q_i$ can be determined in accordance with equations (6) and (7).

However, the calculated $Q_i$ is limited by the condition that it should not be varied too significantly from macroblock to macroblock. Namely $Q_i$ is limited by the conditions:

if $Q_i < (Q_{last} - e)$, then $Q_i = (Q_{last} - e)$, if $Q_i > (Q_{last} + e)$, then $Q_i = (Q_{last} + e)$, $\qquad (8)$ where $Q_{last}$ is the quantizer scale for an immediate previous macroblock having an $R_i$ and "e" is a constant selected to be a value "2" (other values can be used depending on the application). Namely, the calculated $Q_i$ is limited by a change to be no greater than a value of "2" from macroblock to macroblock. This limitation maintains uniform visual quality, i.e., minimizing significant changes in visual quality from macroblock to macroblock. It should be noted that if an immediate macroblock is skipped (a macroblock without an $R_i$), then $Q_{last}$ is based on the next immediate "non-skipped" macroblock.

In step 450, the $Q_i$ is used to encode the macroblock to generate an "actual $R_i$" (the actual number of bits used to encode the macroblock). After actual encoding, the actual $R_i$ and the $Q_i$ are used to update the parameters $X_1$ and $X_2$ using a polynomial regression model or a quadratic regression model to refine the parameters $X_1$ and $X_2$. Namely, the constants $X_1$ and $X_2$ are updated to account for the discrepancy between the bits allocated to an macroblock and the actual number of bits needed to the code the macroblock for a particular quantizer level or scale. Regression models are well known in the art. For a detailed discussion of various regression models, see e.g., Bowerman and O'Connell, Forecasting and Time Series, 3rd Edition, Duxbury Press, (1993, chapter 4).

Furthermore, $T_{frame}$ is then updated by subtracting the actual $R_i$:

$T_{frame} = T_{frame} - \text{actual } R_i. \qquad (9)$

When the entire frame is encoded, the actual $T_{frame}$ (the actual number of bits used to encode the frame) can then be used to update the method that is tasked with generating a target frame bit rate, e.g. as illustrated in FIG. 3 above.

Although the above embodiment employs $R_i$ to compute a quantizer scale for a macroblock, other coding parameters such as allocation of computing resources can be implemented. Namely, if it is determined that a particular macroblock or a series of macroblocks has a high $R_i$, then it is possible to allocate more processing power, e.g., dedicating more processors in a multiple processors coding system in coding a particular macroblock or a series of macroblocks.

In step 470, method 400 queries whether there is a next macroblock in the frame. If the query is negatively answered, then method 400 ends in step 480. If the query is positively answered, then method 400 returns to step 430, where steps 430–460 are repeated until all the macroblocks are evaluated in the current frame.

Figure 5:
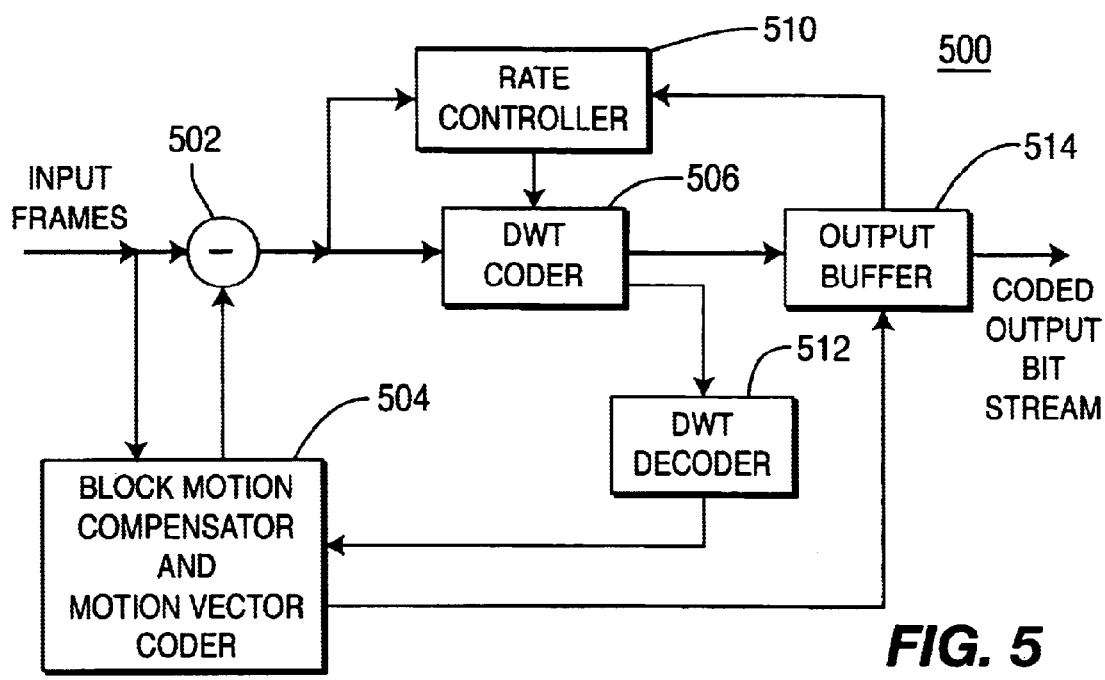
FIG. 5 illustrates a block diagram of a second embodiment of the apparatus of the present invention.

FIG. 5 depicts a wavelet-based encoder 500 that incorporates the present invention. The encoder contains a block motion compensator (BMC) and motion vector coder 504, subtractor 502, discrete wavelet transform (DWT) coder 506, bit rate controller 510, DWT decoder 512 and output buffer 514.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 504, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 6:
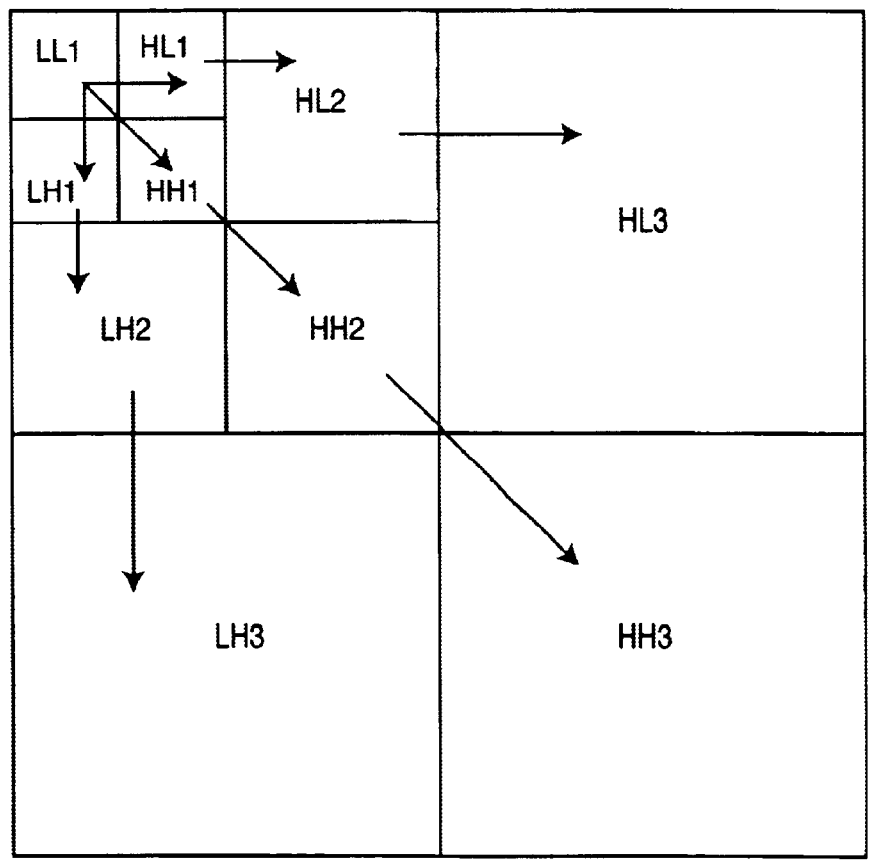
FIG. 6 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 6 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 5 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up). The selection of the proper quantization level by the rate controller 510 is as discussed above to control the bit rate for each macroblock within each frame of a sequence. As such, the present invention can be adapted to various types of encoders that use different transforms.

Figure 7:
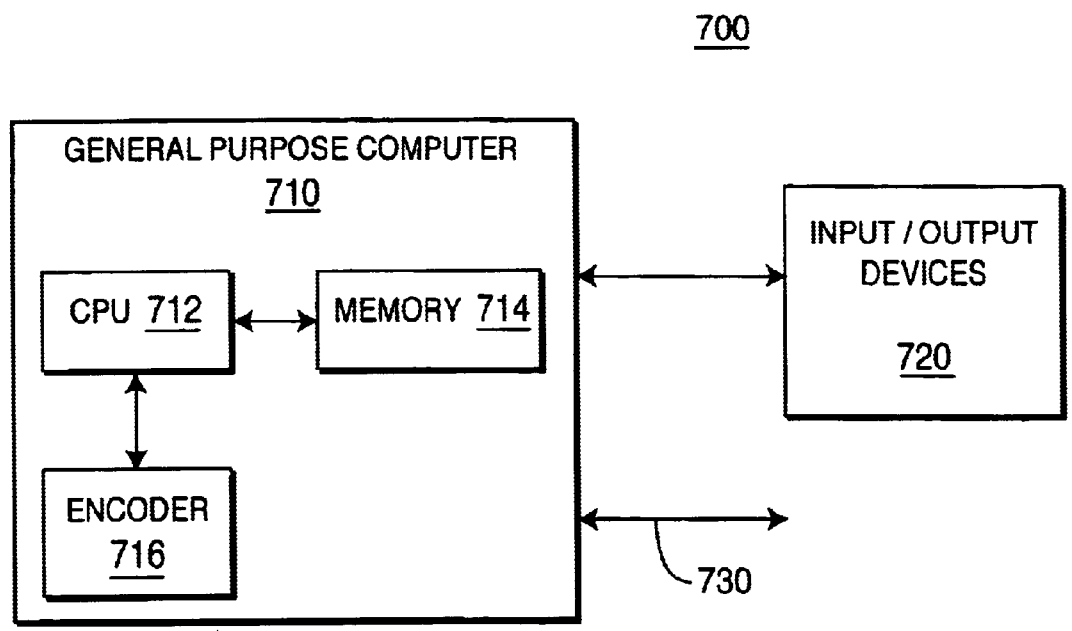
FIG. 7 illustrates an encoding system of the present invention.

FIG. 7 illustrates an encoding system 700 of the present invention. The encoding system comprises a general purpose computer 710 and various input/output devices 720. The general purpose computer comprises a central processing unit (CPU) 712, a memory 714 and an encoder 716 for receiving and encoding a sequence of images.

In the preferred embodiment, the encoder 716 is simply the encoder 100 and/or encoder 500 as discussed above. The encoder 716 can be a physical device which is coupled to the CPU 712 through a communication channel. Alternatively, the encoder 716 can be represented by a software application (or a combination of software and hardware, e.g., application specific integrated circuits (ASIC)) which is loaded from a storage device and resides in the memory 712 of the computer. As such, the encoder 100 and 500 of the present invention can be stored on a computer readable medium, e.g., a memory or storage device.

The computer 710 can be coupled to a plurality of input and output devices 720, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 730 is shown where the encoded signal from the encoding system is forwarded to a decoding system (not shown).

There has thus been shown and described a novel apparatus and method that selects a quantizer scale for each macroblock within each frame to maintain the overall quality of the video image while optimizing the coding rate. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention.

What is claimed is:

1. A method for allocating bits to encode each frame of an image sequence, each of said frame having at least one block, said method comprising the steps of:

(a) determining a target frame bit rate for the frame; and (b) allocating said target frame bit rate among the at least one block in accordance with a target block bit rate for the at least one block, wherein said target block bit rate for the at least one block is selected in accordance with a mean absolute difference (Mad) of said block.

2. The method of claim 1, wherein said target block bit rate is determined in accordance with:

$$R_i = K_i \times T_{frame}$$

$$K_i = \frac{Mad_i w_i}{\sum_{k=i}^{n} Mad_k w_k} \text{ for } Mad_k \text{ having } SAD_k > H_q$$

where Mad is the mean absolute difference (MAD) of a block, n is a number of blocks in the frame, w is a weighting factor and $R_i$ is said target block bit rate, Sad is a sum of absolute difference (SAD) of a block, $T_{frame}$ is said target frame bit rate and $H_q$ is a constant.

3. The method of claim 1, wherein said target block bit rate is adjusted in accordance with a threshold $H_q$.

4. The method of claim 3, wherein said target block bit rate is adjusted by removing each block within the frame having a sum of absolute difference (SAD) that is less than said threshold $H_q$ from said step (b) of allocating said target frame bit rate among the at least one block.

5. The method of claim 1, wherein said block is a macroblock.

6. The method of claim 1, wherein said target frame bit rate, $T_{frame}$, is derived in accordance with:

$$T_{frame} = \frac{R}{Nf} \times (1 - \text{past\_percent}) + T_{previous\ frame} \times \text{past\_percent}$$

where R is a remaining number of bits for the image sequence, Nf is a number of remaining frames in the image sequence, $T_{previous\ frame}$ is a number of bits used for encoding a previous frame, and past_percent is a constant.

7. The method of claim 1, further comprising the step of:
    (c) generating a quantizer scale for said at least one block in accordance with said target block bit rate.
8. The method of claim 7, further comprising the step of:
    (c') adjusting said quantizer scale in accordance with a previous quantizer scale of a previous block.
9. The method of claim 7, further comprising the step of:
    (d) encoding said at least one block with said quantizer scale.
10. Apparatus for encoding each frame of an image sequence, said frame having at least one block, said apparatus comprising:
    a motion compensator for generating a predicted image of a current frame;
    a transform module for applying a transformation to a difference signal between the current frame and said predicted image, where said transformation produces a plurality of coefficients;
    a quantizer for quantizing said plurality of coefficients with at least one quantizer scale; and
    a controller for selectively adjusting said at least one quantizer scale for a current frame in response to a target block bit rate for the at least one block, wherein said target block bit rate for the at least one block is selected in accordance with a mean absolute difference (Mad) of said block.
11. The apparatus of claim 10, wherein said target block bit rate for each of a plurality of blocks is selected in accordance with:

$$R_i = K_i \times T_{frame}$$

$$K_i = \frac{Mad_i w_i}{\sum_{k=i}^{n} Mad_k w_k} \text{ for } Mad_k \text{ having } SAD_k > H_q$$

where Mad is the mean absolute difference (MAD) of a block, n is a number of blocks in the frame, w is a weighting factor and $R_i$ is said target block bit rate, Sad is a sum of absolute difference (SAD) of a block, $T_{frame}$ is said target frame bit rate and $H_q$ is a constant.

12. The apparatus of claim 10, wherein said target macroblock bit rate is adjusted in accordance with a threshold $H_q$.
13. The apparatus of claim 12, wherein said target block bit rate is adjusted by removing each block within the frame having a sum of absolute difference (SAD) that is less than said threshold $H_q$.
14. The apparatus of claim 10, wherein said block is a macroblock.
15. The apparatus of claim 10, wherein said target block bit rate is derived from a target frame bit rate.
16. The apparatus of claim 15, wherein said target frame bit rate, $T_{frame}$, is derived in accordance with:

$$T_{frame} = \frac{R}{Nf} \times (1 - \text{past\_percent}) + T_{previous\ frame} \times \text{past\_percent}$$

where R is a remaining number of bits for a sequence of frames, Nf is a number of remaining frames in the sequence, $T_{previous\ frame}$ is a number of bits used for encoding a previous frame, and past_percent is a constant.

17. A computer-readable medium having stored thereon a plurality of instructions, the plurality of instructions including instructions which, when executed by a processor, cause the processor to perform the steps comprising of:
    (a) determining a target frame bit rate for the frame; and
    (b) allocating said target frame bit rate among the at least one block in accordance with a target block bit rate for the at least one block, wherein said target block bit rate for the at least one block is selected in accordance with a mean absolute difference (Mad) of said block.
18. The computer-readable medium of claim 17, wherein said target block bit rate is determined in accordance with:

$$R_i = K_i \times T_{frame}$$

$$K_i = \frac{Mad_i w_i}{\sum_{k=i}^{n} Mad_k w_k} \text{ for } Mad_k \text{ having } SAD_k > H_q$$

where Mad is the mean absolute difference (MAD) of a block, n is a number of blocks in the frame, w is a weighting factor and $R_i$ is said target block bit rate, Sad is a sum of absolute difference (SAD) of a block, $T_{frame}$ is said target frame bit rate and $H_q$ is a constant.

19. The computer-readable medium of claim 17, wherein said target block bit rate is adjusted in accordance with a threshold $H_q$.
20. The computer-readable medium of claim 17, wherein said target frame bit rate, $T_{frame}$, is derived in accordance with:

$$T_{frame} = \frac{R}{Nf} \times (1 - \text{past\_percent}) + T_{previous\ frame} \times \text{past\_percent}$$

where R is a remaining number of bits for the image sequence, Nf is a number of remaining frames in the image sequence, $T_{previous\ frame}$ is a number of bits used for encoding a previous frame, and past_percent is a constant.

* * * * *